United States Patent [19]

Earle et al.

[11] Patent Number: 4,504,502

[45] Date of Patent: Mar. 12, 1985

[54] COATED FOOD PRODUCT AND METHOD OF MAKING SAME

[76] Inventors: Roland D. Earle, 9201 W. Brow Rd. Blvd. #C-220, Plantation, Fla. 33324; Donald H. McKee, 204 S. O'Brian St., Tampa, Fla. 33609

[21] Appl. No.: 482,678

[22] Filed: Apr. 6, 1983

[51] Int. Cl.³ .............................................. A23L 1/04
[52] U.S. Cl. .................................. 426/293; 426/305; 426/575; 426/296
[58] Field of Search ............... 426/575, 293, 305, 289, 426/302, 290

[56] References Cited

U.S. PATENT DOCUMENTS

| | | | |
|---|---|---|---|
| 2,611,708 | 9/1952 | Owens | 426/305 |
| 3,255,021 | 6/1966 | Earle et al. | 426/305 |
| 3,395,024 | 7/1968 | Earle | 426/305 |
| 3,539,362 | 11/1970 | Laurens | 426/305 |
| 3,865,962 | 2/1975 | Earle | 426/293 |
| 3,991,218 | 11/1976 | Earle | 426/305 |
| 4,066,796 | 1/1978 | McKee | 426/305 |
| 4,386,108 | 5/1983 | Richter | 426/575 |

*Primary Examiner*—Jeanette Hunter
*Attorney, Agent, or Firm*—Neil F. Markva

[57] ABSTRACT

A coated food product of this invention is produced by applying an aqueous dispersion containing water soluble algin to the surface of a food substrate. The aqueous dispersion has a viscosity effective to substantially uniformly coat the surface of the food substrate. A dry gelling mixture is then applied to the algin-coated food substrate for a period of time sufficient to form a substantially continuous edible alginate film along the surface of the food substrate. The film is sufficient to effectively retard the migration of moisture from the surface of the food substrate thereby retarding dehydration thereof. The film is sufficient to constitute an oxygen barrier for retarding oxidation of the food substrate and to retain flavor within said food substrate. The dry gelling mixture comprises a dry carrier material and a dry gelling agent. The carrier material and gelling agent are in particulate form and have particle sizes sufficient to obtain a substantially uniform gelling mixture.

16 Claims, No Drawings

COATED FOOD PRODUCT AND METHOD OF MAKING SAME

FIELD OF THE INVENTION

This invention relates to the preparation of food coatings on food products. More particularly, it is directed to the processing of a food product which may be subjected to a multiplicity of steps for treating food products with batters, breadings, sauces and fillings.

BACKGROUND OF THE INVENTION

It is well known to form a film around food products such as seafood, meat, poultry, vegetables and dough products for effecting positive results with respect to shelf-life and product integrity. The Earle et al U.S. Pat. No. 3,255,021 and the Earle U.S. Pat. No. 3,395,024 exemplify the prior art process of using two solutions to form an alginate film which will hold and bind products together, encapsulate same thereby retarding oxidation, rancidity, dehydration and moisture migration. This known procedure is referred to herein as the wet/wet process or system.

A particular problem of moisture migration exists where a product is to be filled with a filling or coated with a food coating such as a batter or breading. Such moisture migration causes a loss of flavor during cooking of the food product, objectionable sogginess, dough-like interfacing, and excess and distorted browning of protein, sugars and other chemicals which are in food. Where a standard of identity is set for breaded products by the Food and Drug Administration or the Department of Agriculture, such moisture migration may cause the breading percentage to be much higher than is specifically allowed by that government agency.

The standard of identity for breading shrimp requires the product to have no more than 50% shrimp and 50% breading. Shrimp may be classified as lightly breaded containing no more than 35% breading. Imitation is classified as over 50% breading. However, if moisture migrates from the shrimp (which itself is over 80% water) and into the breading, it is possible to raise the percentage by weight of the breading significantly more than 50%. If the amount becomes greater than 52%, then the product must be listed as an imitation product because the dominant portion of the product would then be breading. In a lightly breaded fish product, the fish must be 65% and the breading can be no more than 35%. In a lightly breaded chicken product the breading can be no more than 30%. It is known that even in frozen storage, there is moisture migration from the fish and shrimp and other foods into the breading. Thus, it is extremely important that the moisture migration be retarded significantly to give such product added shelf life. This recognized problem is now solved through the use of the present invention.

The alginate coatings produced in the wet/wet system have many satisfactory uses. However, we have found that batters and breadings do not readily adhere to such alginate coatings. Further, sauces, such as butter sauces, run off such alginate coatings placed on a product being baked or broiled. Another problem is in producing an adhering, continuous alginate coating over an oily or waxy surface. That is, it is difficult to form a coating on such vegetables as peppers, onions, zucchini, squash, and on such protein products as cheese, sausage, ground beef, chicken skin, pork, lamp, beef and other meat combinations with cold fat on the surface. In our U.S. Pat. No. 3,865,962, we used a predusting step to overcome the problem of making breaded onion rings. Other surface pretreating steps such as acid or caustic washing or surface heating step may be necessary to prepare the food product for subsequent coating.

Browning is caused in food products when sugars and proteins migrate into the final breading. When such an action occurs, there is an uneven browning of the products which as being fried or baked. Fruits, vegetables and meat contain both sugars and proteins which, when breaded without an alginate coating, will result in such browning difficulties. Other chemicals included in the food product might also cause uneven or distorted browning during cooking. As an example, whey is an approved protein supplement. Some types of whey migrate thereby causing excess and uneven browning during the cooking of any food product having such a protein supplement.

There are several disadvantages associated with the prior art processes of applying an alginate coating to a food product. In the well known wet/wet process, a first solution includes a water soluble algin and the second solution inclues a gelling material such as calcium chloride. Extra machines are necessary for applying the separately prepared solutions. This, of course, involves additional cost in equipment, floor space and handling for the processing of the food product.

PURPOSE OF THE INVENTION

The primary object of this invention is to provide a moisture barrier on a food product having a batter, breading, sauce or filling wherein there is an improved control of moisture migration between the food product substrate and the batter, breading, sauce or filling.

Another object of the invention is to provide an edible protective film that is sufficient to constitute an oxygen barrier for retarding oxidation thereby preventing ingredients highly susceptible to oxidation from becoming rancid.

Another object of the invention is to provide a protective, edible film on a food product which will retain flavors within the food product during cooking and be sufficient to effectively retard scorching of those products susceptible to scorching during a cooking step.

A still further object of the invention is to provide an extended shelf-life for a food product having a batter, breading, sauce or filling compared to such food products available heretofore.

Another object is to provide a method of protecting food and holding crumbs to a food product which will be baked or broiled.

A particular object is to provide a dry gelling system for producing an alginate film which will hold sauces on a food product so that a uniform color and uniform flavor is obtained on the cooked food product without losing the sauce in the cooking pan.

Still another further object of the invention is to provide a method of producing an adhering, continuous alginate film on food products having oily and/or slippery surfaces while eliminating the need for a pre-dusting or other surface pretreating steps.

SUMMARY OF THE INVENTION

The food product of this invention is made by applying an aqueous dispersion containing water soluble algin to the surface of a food substrate. The aqueous dispersion has a viscosity effective to substantially uniformly coat the surface of the food substrate. The a dry gelling mixture is applied to the algin-coated food substrate for a period of time sufficient to form a substantially continuous edible film along the surface of the food product. The coated food substrate provides a foundation for contact with batter to cling or for contact with another food substance such as a breading, sauce or filling. The food substrate may be seafood, poultry, meat, vegetables, fruits, combinations or dough products. The dough products may include pizza, tortillas, pie crust and the like. Unlike the known processes available for forming continuous edible films along the surface of the food substrate, the process of the present application may be effected using standard batter and breading machines and other existing equipment to achieve the desired results of the process.

A particular feature of the invention is directed to the dry gelling mixture which comprises a dry carrier material mixed with a dry gelling material or agent. It is important that the particle sizes of the dry materials be sufficient to obtain a substantially uniform gelling mixture. When using calcium ions such as calcium chloride and calcium lactate, etc. as a particulate gelling material, the particle size of the gelling material must be at least as small as 60 mesh. It has also been found to be successful down to 100 mesh size.

The gelling material is present in the gelling mixture in an amount from about 1% to about 4% of the total weight of the dry gelling mixture. A more specific operating range has been found to require the gelling material to be in an amount of from about 2% to about 3% by weight of the dry gelling mixture.

Another feature of the invention is the production of the dry gelling mixture using a solvent to place the gelling material into solution or a dispersion. The gelling mixture is first dissolved in the solvent material such as water or an organic solvent material such as methyl alcohol or ethyl alcohol. The gelling material solution or dispersion is then mixed with a dry carrier material such as wheat crumbs or corn crumbs. The solvent material is then evaporated thereby leaving a dry gelling mixture as a residue of carrier material with the gelling agent absorbed therein. That gelling mixture is then ready for use to form a substantially continuous coating by applying the same to a food substrate having been first coated with an algin containing solution.

In another feature of the invention, the aqueous dispersion containing the water soluble algin is treated to cover an oily or slippery surface of a food substrate. Such food substrates as onions, green peppers, zucchini, squash, chicken products covered with skin, pork, lamb, beef and combinations thereof having cold fat surfaces and the like are difficult to completely cover with the algin-containing solution. Unexpectedly, an edible wetting agent added to the aqueous dispersion in a sufficient amount produces a wetting of the entire oily surface of the food substrate being coated. This is a major breakthrough and enables this type of product to be covered with a batter, breading or sauce using existing, standard equipment for batter and breading applications. The aqueous dispersion containing algin and a wetting agent such as dioctyl sodium sulfosuccinate (docusate) mixed in the algin solution can be applied to the food substrate in the standard batter applying equipment. This discovery also makes it possible to effect complete wetting of beef parts, pork and lamb for storage and cheese cubes covered with batter and breading followed by deep frying. This technique having been discovered in the present invention enables the coating of food products where even the predusting of the oily surface does not produce a complete covering by the algin solution.

DETAILED DESCRIPTION

The alginate coating composition for use in the process of this invention can be prepared by adding water-soluble algin to water. Any water-soluble algin such a sodium, potassium and ammonium salts of alginic acid, that will gel with a calcium ion, may be used. Sodium algin-containing solution in its less degraded form, namely, the high viscosity grades, and as known in the prior art is generally used in the specific embodiments of this invention.

An edible filler and/or carrier material may be mixed with the algin. Examples of carrier materials that have been used include carbohydrates comprising monosaccharides, polysaccharides, and mixtures thereof. More specifically, dextrose, malto dextrin, sorbitol or corn syrup solids may be used in this process. When using algin alone, the coating composition is prepared by adding water-soluble algin to distilled water at room temperature. The algin-containing films used in this invention include up to about 90% water at the time it is first formed.

The water-soluble algin is added to pure drinking water until the resulting aqueous dispersion has a viscosity in the range of 350 to 5,000 centipoises at room temperature. Filler materials may be used with the algin in an appropriate relationship from about 2½ to 20 parts by weight of the water-soluble algin to about 97½ to 80 parts by dry weight of the filler material. When necessary to wet an oily or slippery surface, dioctyl sodium sulfosuccinate is added as a wetting agent in a range of from about 0.05 to 0.5 by weight of the solution in a sufficient quantity of distilled water to produce an aqueous dispersion having an viscosity of 350 to 5,000 centipoises at room temperature.

Once the food product is coated with the algin-containing solution, a gelling mixture is placed on the algin coated food product. A gelling agent is any source of calcium ion which may be mixed with a dry carrier material. Calcium ions such as calcium chloride, calcium lactate, or other well known gelling materials.

Many carrier materials may be used to form a dry gelling mixture with the gelling material such as calcium chloride. These carrier materials include soy grits, soy protein isolates, potato flakes, potato granules, potato and various starches, oats, corn, corn flours and various breading materials which include wheat flour or crumbs, corn flour, whey, dry milk solids, dried egg, seasonings, colorings and leavening agents and mixtures thereof.

A particular feature of the present invention is retarding sauce migration from fillings into dough products. In a specific instance, burritos are very thin and made of a flour or corn dough. Sauce tends to significantly migrate into the very thin burrito dough. The known wet/wet process could make the dough product too soggy which necessitates additional baking to dry the film before filling ingredients can be used. The burritos being produced for packaging and sale in the grocery store are partially cooked and thus are highly subject to the sauce migration. However, when using the wet/dry process of the present invention, a gelling mixture comprising flour and calcium chloride was sprinkled on a flour burrito after the initial algin-containing solution was placed on the burrito surface. The dry gelling mixture of flour and calcium chloride caused the formation of an alginate coating and thus formed a boundary layer retarding the moisture migration of the burrito filling into the flour dough.

The very same kind of procedure is followed when making corn tortillas. In this instance, corn meal was used as a carrier material mixed with the dry, particulate calcium chloride. The carrier materials are related directly to the material used to form the dough in the first instance. Consequently, there is no difference in appearance or mouth feel or taste when using the wet/dry process of the present invention. Similar processing has been accomplished for graham cracker pie shells, pie crusts and other pastry products such as pizza crust.

The dry gelling mixture of this invention is made in two particular ways. In the first procedure, a gelling agent such as calcium chloride is dissolved in water or a volatile organic solvent such as methyl alcohol or ethyl alcohol. The solution containing the calcium chloride is mixed with breading and the solvent material is then allowed to evaporate. The residual material constitutes a dry breading material having calcium chloride mixed throughout. The appropriate amount of calcium chloride will be in the range of from about 1% to about 4% of the dry gelling mixture.

The second method of making the dry gelling mixture includes mixing of a fine particulate gelling material containing calcium ions; such as calcium chloride, calcium lactate, etc., with the correct quantity of various breading materials. Experts in the field of breading manufacturers have said that such a blending of particulate material involving calcium chloride would be impossible. This is due particularly to the bitterness, caking, particle size, desired uniform distribution, and hydroscopic action of calcium chloride. Such characteristics would preclude the forming of a blended dry gelling material with a breading carrier material. However, quite unexpectedly, by adding the proper particle size for the calcium chloride which may be accomplished by remilling with the correct quantity and particle size of the carrier breading materials, a dry gelling mixture will form a substantially continuous alginate coating from an aqueous, algin containing solution placed on the surface of a food product. This is achieved without leaving a bitter taste on the cooked edible food product.

A fine particle calcium chloride that has been remilled to produce a small particle size to mix with various carrier materials having particle sizes which blend well with the particle size of the calcium chloride. Bread crumbs having a size of about 18 mesh have been successfully used with calcium chloride having a size of 60 mesh or smaller. Some dry carrier materials have a rather high moisture content of from about 7% to 10%. Consequently, because calcium chloride is so hydroscopic, lumps may form while blending the misture and in storage. The carrier material used with the dry gelling agent should have a moisture content of less than about 5%. This is sufficient to preclude lump formation in the gelling mixture. Furthermore, the humidity of the environment in which the blending of the carrier material and the gelling agent is effected must be sufficient to preclude the formation of lumps in the mixture. Sufficient amounts of silicon dioxide (silica gel) the other materials such as proteins, corn syrup, whey can be added to the gelling mixture to retard lump formation. When the moisture content of the breading carrier material is in the range of from about 7% to about 10%, silicon dioxide added as a dry substance should be in the range of from about 0.5% to about 1.5% by weight of the gelling mixture.

A typical example of the gelling mixture having a carrier material with a moisture content of less than about 5% is as follows:

| Ingredient | Percent by Weight |
| --- | --- |
| Wheat bread crumbs - 18 mesh | 98% |
| Calcium Chloride 60 mesh particle size | 2% |

A typical example of a gelling mixture having a carrier material with a moisture content of greater than about 7% is as follows:

| Ingredient | Percent by Weight |
| --- | --- |
| Wheat bread crumbs - 18 mesh | 97% |
| Calcium Chloride 60 mesh particle size | 2% |
| Silicon Dioxide | 1% |

The particle size of the carrier material may range from that of flour to a crushed crumb.

The amount of algin in the gelled material is varied depending upon the food product involved. Greater amounts produce stronger and thicker alginate coatings. For example, if the food product has a very low moisture content and is firm, a lesser amount of algin may be used. On the other hand, if the food product is hard to handle such as an extruded food product, a greater amount of algin is used with additional batter, breadings or sauces. In each instance, the specific percentage of the calcium chloride is determined.

In the numerous examples used to form the dry gelling mixture with a dry, particulate gelling agent and a dry carrier breading material, remilled calcium chloride was used having an extremely small particle size. That is, the particle size must be at least 60 mesh. It was found that using larger granules of calcium chloride would not work because the flavor of the food product would be extremely bitter. When calcium lactate is used as a source of calcium ion, it must be used in amounts that are about 2 times the amount of calcium chloride which would accomplish the same results of gelling the alginate coating.

Where a heavier breaded coating is desired, two separate batter-breading steps gives a better result thatn having a very thick batter and then breading that thick batter. In this latter instance, the breading does not adhere as tightly to the battered food product. The resultant breaded product is extremely difficult to handle thus making any packing procedure very slow.

While batters and breadings partially retard dehydration, they generally offer little or no protection from oxidation of the food product to which they adhere. The wet/dry procedure of the present invention placed on a food product substrate in the first instance followed by a batter-breading step results in a tightly adhering bread-batter coating. The resultant produced exhibits retarded dehydration and its packing is easy and rapid.

A particular use of the batter-breading procedure of the present invention is in making a tempura coating for a frozen food product. The food product covered with the batter must be prefried in an edible oil to hold the shape and set color of the coating. Otherwise, there is a doughy mess in the package if there is any slight thawing after the product is quick frozen. The food product substrate is first coated with the algin-containing solution and then dusted with the dry gelling mixture. The product is then dipped into the tempura batter followed by the deep frying step. Such a tempura batter is generally thicker than batter which would be used for the usual batter and breading sequence.

To produce a breaded food product in accordance with the present invention, the food product is placed on a feed belt which passes through a first batter machine, a first breading machine, followed by a second batter machine and a final breading machine. The algin-containing solution is in the first batter machine and the dry gelling mixture is in the first breading machine. Standard techniques are used for covering the food substrate passing along the path of the feed belt. There is immediate gelling of the alginate film when the dry gelling mixture is applied after any excess of the algin-containing solution is removed from the food substrate. The second batter machine contains a batter mixture and the second breading machine contains a breading mixture. The gelled alginate coating has a tightly adhering, integrally held breading material which forms the foundation for the subsequent batter and breading steps. These steps are effected as the feed belt moves the food substrates sequentially through the second batter and breading machines. Where the food substrate has need for only a light breading, the second batter and breading steps may be eliminated.

Advantages of the Invention

Quite unexpectedly food products processed in accordance with this invention hold their natural shape much better than the previous wet/wet process. That is, the use of the gelling material in a dry mixture rather than in a second solution has achieved this new and unexpected result.

When using the wet/dry process of the present application, many different sauces can be used on food products while retaining the flavor of the sauce with a uniform browning of the food product during cooking. Such a result has not been possible using the wet/wet process of the prior art. In a number of instances, chives, finely ground dehydrated onions, and parsley were mixed into the sauces. In these instances, the uniformity of flavor of the sauce was established throughout the coating of the food product. Furthermore, the chives, onions and parsley stayed on top of the product and did not run off if mixed with a sauce as has been the problem in prior art processing.

There has been a problem using paprika on coated food products since the paprika generally turns dark during storage and baking or broiling. However, with the wet/dry process of this invention, paprika is placed on the dry gelling material after it has been applied to the food product. Sauce is then disposed over the gelled material coating. In this instance, the paprika did not turn dark during baking and broiling.

The wet/dry process of the present invention is extremely versatile. Flavorings to be used on the coated food product may be added to the algin containing solution which is placed initially on the food product surface. Such flavorings include onion, garlic, smoke, barbeque and cheese flavors. On the other hand, however, browning agents, colorings, vegetables and flavorings may be added to the dry gelling mixture for additional flavor, eye appeal and whey for protein supplement. Food products such as seafood, meat, poultry, vegetables and dough products such as pizzas, burritos, and tortillas have been coated successfully using the wet/dry system of the present invention. In some instances, fish, chicken breasts and pork chops have been stuffed with dressings before being treated with the wet/dry coating procedure of the present invention. It has been unexpectedly found that the dry gel procedure results in sauces being useable on the alginate coated food product resulting in a uniform color and uniform flavor rather than having the sauce being lost in the cooking pan.

The food product of the wet/dry procedure of this invention is dryer and easier to handle than those food products resulting from the wet/wet system of the prior art. Furthermore, there is a tighter adhesion between the dry gelled material and any subsequent batter and breading steps placed thereon than when a batter and breading is put on the wet/wet-formed alginate coating. That is, the product resulting from the present invention procedure has greater coating integrity. Since it is easier to handle, any packing of the product is speeded up when compared to the packing procedures required for the finished product of the wet/wet system.

With the process of the present invention, it is now possible to produce an alginate coating having a tightly adhering breading material as a result of mixing a dry gelling material with the breading material. This is a significnat breakthrough since this particular product may be frozen and sold to the consumer for subsequent baking or broiling. The dry gelling material such as calcium chloride is distributed evenly throughout the dry gelling mixture used to form the substantially continuous alginate coating over the surface of the food product. This same product may be subjected to a very light batter and thus be prepared for deep frying in oil. With the significant increase of adhesion between the batter and the breading of the dry, gelled alginate coating, there is less pick-up of oil due to retarding moisture migration which causes doughiness and oil absorption. Thus, the ultimate fried product will be more crisp. It is also possible to subject the dry, gelled breaded product to a coating of a sauce such as a butter based or cream based sauce which has been mixed with various seasonings. Since there is a significant increase in the adherance between the sauce and the dry gelled breaded alginate coating, the sauce will not run off when it is subjected to cooking at the consumer level. With the process and product of the present invention it is now possible to obtain the protection against oxidation, dehydration, moisture migration without significant cost and have an excellent breaded product available for immediate cooking. Because the dry, breaded alginate coating gives a good foundation for batter, there is actually less batter and breading placed upon the food substrate as a breaded food product. Thus, there is more flavor available and the lesser thickness of batter reduces the possibility of doughiness being present in the cooked product. The cooking takes place after the product has been processed and produced as a frozen food product. The discovery of a satisfactory wetting agent which may be dissolved in the aqueous dispersion presents the exciting capability of breading items such as onions, peppers, chicken skin, covered chicken parts and the like successfully with the alginate coatings.

While the coated food product and method of making same has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A process for coating food products comprising:
   (a) applying an aqueous dispersion containing water soluble algin to the surface of a food substrate,
   (b) the aqueous dispersion having a viscosity effective to substantially uniformly coat the surface of the food substrate, and then
   (c) applying a dry gelling mixture containing a calcium ion to the algin-coated food substrate for a period of time sufficient to form a substantially continuous edible alginate film along the surface of the food substrate, said particle gelling mixture having a particle size sufficient to obtain a uniform gelling mixture
   (d) said film being sufficient to effectively retard the migration of moisture from the surface of the food substrate thereby retarding dehydration thereof,
   (e) said film being sufficient to constitute an oxygen barrier for retarding oxidation of the food substrate and to retain flavor within said food substrate.

2. A process for coating food products as described in claim 1 wherein
   the dry gelling mixture comprises a dry carrier material and a dry gelling agent.

3. A process for coating food products as described in claim 2 wherein
   the carrier material and gelling agent are in particulate form and have particle sizes sufficient to obtain a substantially uniform gelling mixture.

4. A process for coating food products as described in claim 3 wherein
   the particulate gelling agent is calcium chloride or calcium lactate and has a particle size which blends with the particulate dry carrier material.

5. A process for coating food products as described in claim 2 wherein
   the gelling agent is from about 1 to about 4 percent of the dry gelling mixture.

6. A process for coating food products as described in claim 5 wherein
   the gelling agent is from about 2 to about 3 percent of the dry gelling mixture.

7. A process for coating food products as described in claim 2 wherein
   the dry gelling mixture has been produced by (a) dissolving a gelling agent to form a solution in a solvent material, (b) mixing the gelling agent solution with a dry carrier material and (c) evaporating the solvent material thereby leaving the dry gelling mixture as a residue of carrier material with gelling agent absorbed therein.

8. A process for coating food products as described in claim 7 wherein
   the gelling agent is calcium chloride and the solvent is water, or a volatile organic solvent such as ethyl alcohol or methyl alcohol.

9. A process for coating food products as described in claim 2 wherein
   the aqueous dispersion is applied with a batter machine and
   the dry gelling mixture is applied with a breading machine.

10. A process for coating food products as described in claim 2 wherein
    the aqueous dispersion includes a wetting agent in an amount sufficient to produce a wetting of an oily or waxy surface on the food substrate being coated.

11. A process for coating food products as described in claim 10 wherein
    the wetting agent is specifically dioctyl sodium sulfosuccinate.

12. A food product made by the process of claim 1.

13. In the process of coating a food substrate with another food substance such as batters, breadings, sauces and fillings, a precoating process comprising the steps of:
    (a) applying an aqueous dispersion containing water soluble algin to the surface of the food substrate which surface is to be in contact with said another food substance, and then
    (b) applying a dry gelling mixture containing a calcium ion to the algin coated food substrate for a period of time sufficient to form a substantially continuous edible film along said contact surface of the food substrate, said gelling mixture having a particle size sufficient to obtain a uniform gelling mixture
    (c) applying said another food substance against the substantially continuous edible film on said contact surface.

14. A process for coating food products as described in claim 2 wherein
    the dry carrier material has a moisture content in an amount to preclude the formation of lumps when mixed with the dry gelling agent and to thereby maintain a free flowing characteristic for the mixture.

15. A process for coating food products as described in claim 2 wherein
    the dry gelling mixture includes silicon dioxide in an amount sufficient to control moisture content in the mixture to maintain a free flowing characteristic for the mixture.

16. A process for coating food products as described in claim 15 wherein
    the silicon dioxide is in the range of from about 0.5% to about 1.5% by weight of the dry gelling mixture.

* * * * *